C. F. HAKE, Jr.
MACHINE FOR SOLDERING THE JOINTS OF SHEET METAL CANS.
APPLICATION FILED DEC. 15, 1916.
1,377,339.
Patented May 10, 1921.
5 SHEETS—SHEET 2.
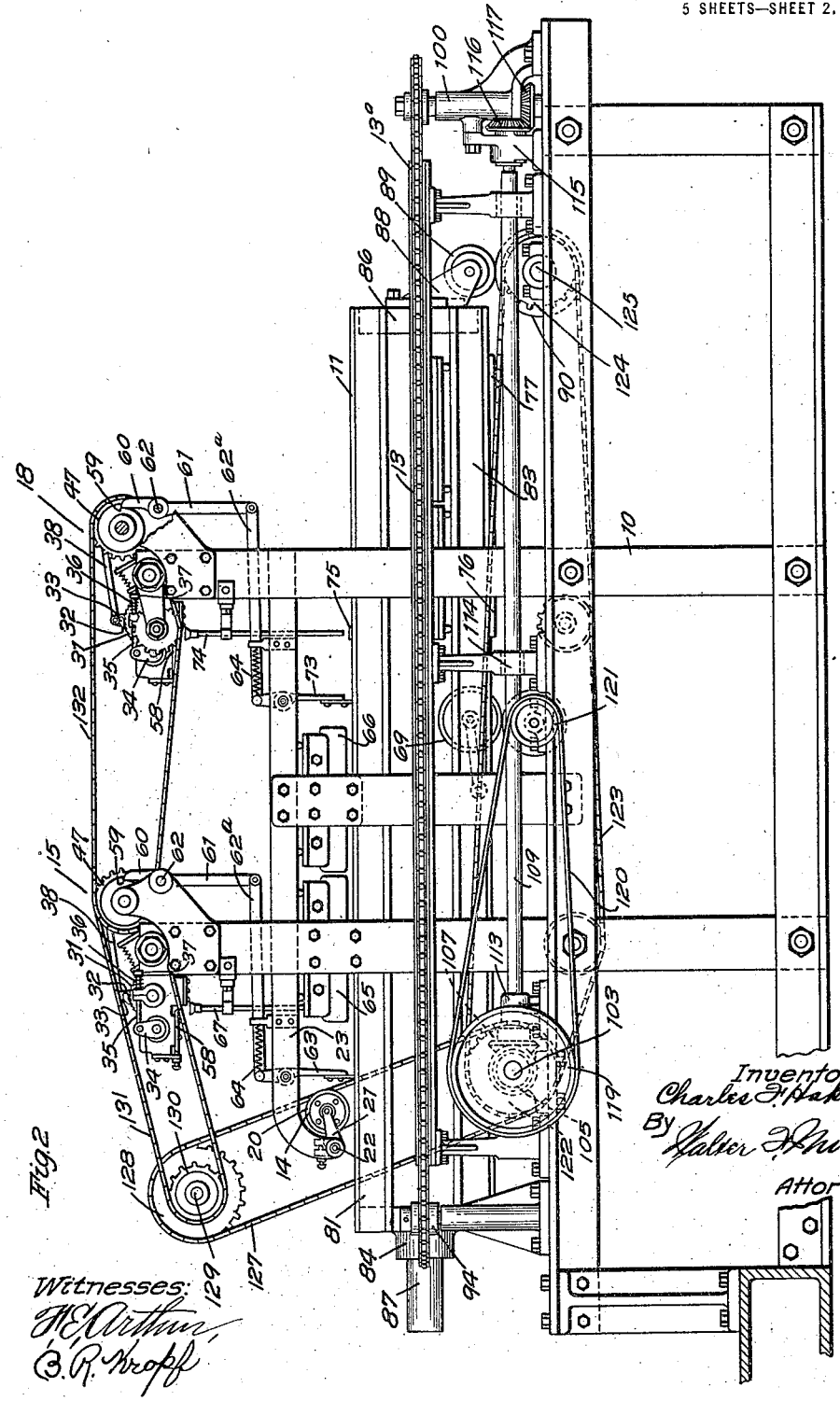

C. F. HAKE, Jr.
MACHINE FOR SOLDERING THE JOINTS OF SHEET METAL CANS.
APPLICATION FILED DEC. 15, 1916.
1,377,339.
Patented May 10, 1921.
5 SHEETS—SHEET 3.
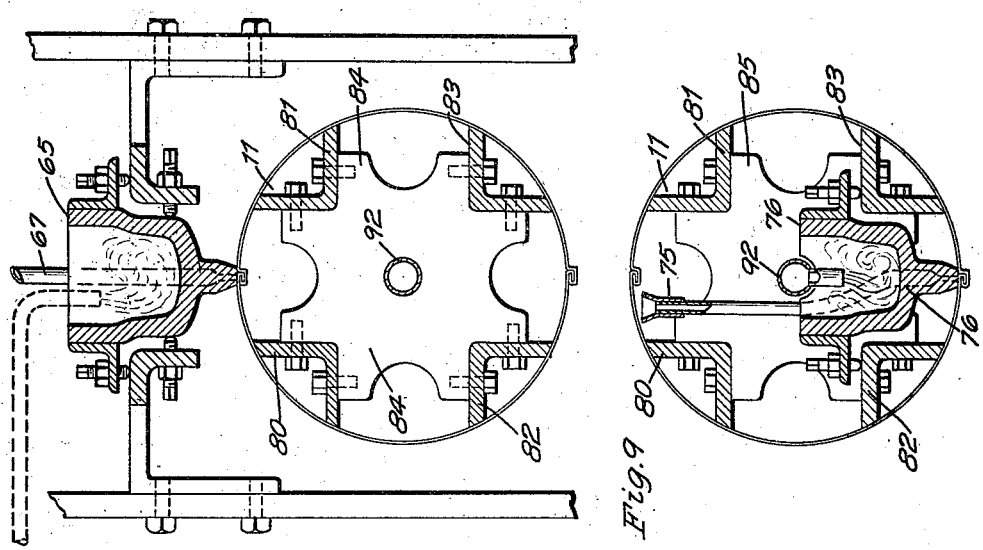
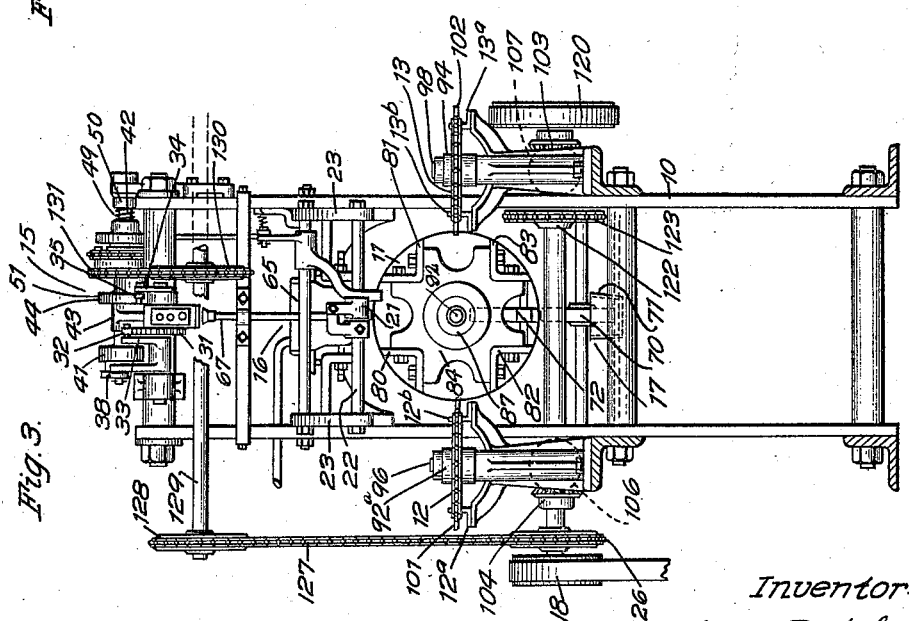

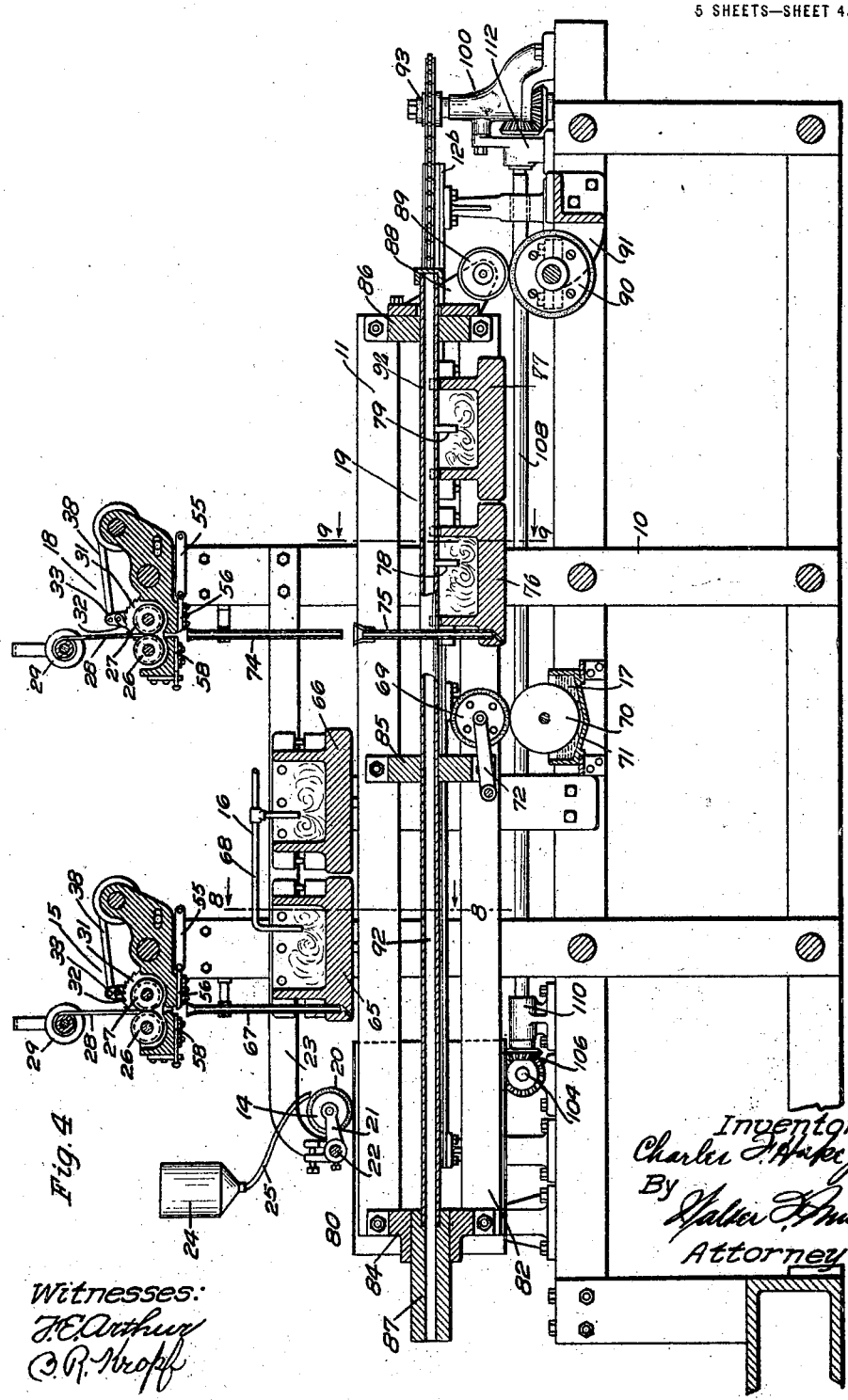

C. F. HAKE, Jr.
MACHINE FOR SOLDERING THE JOINTS OF SHEET METAL CANS.
APPLICATION FILED DEC. 15, 1916.
1,377,339.
Patented May 10, 1921.
5 SHEETS—SHEET 5.
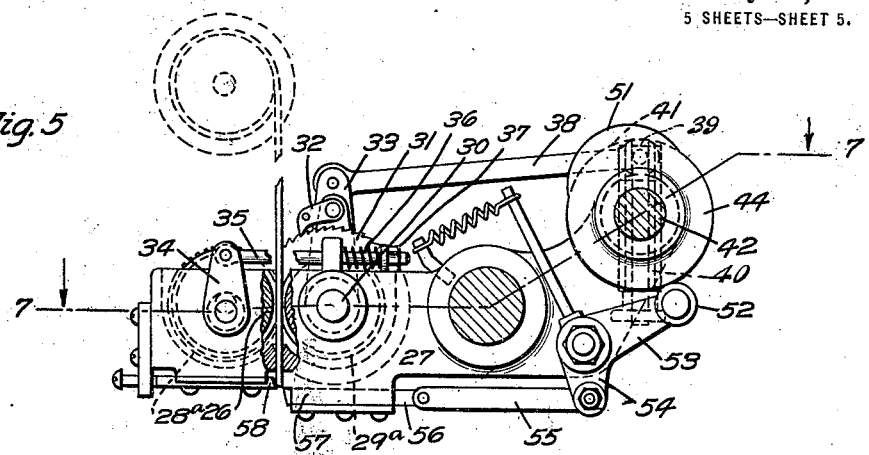
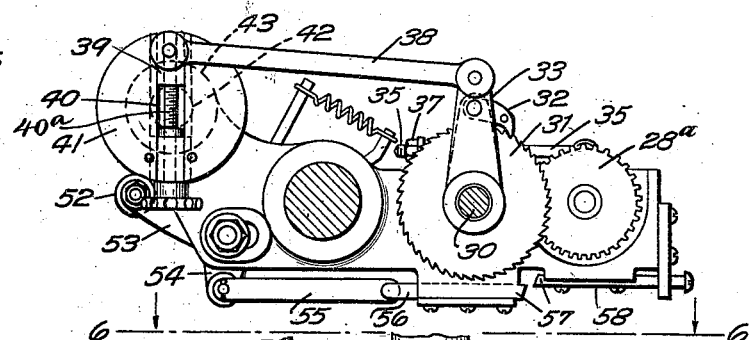
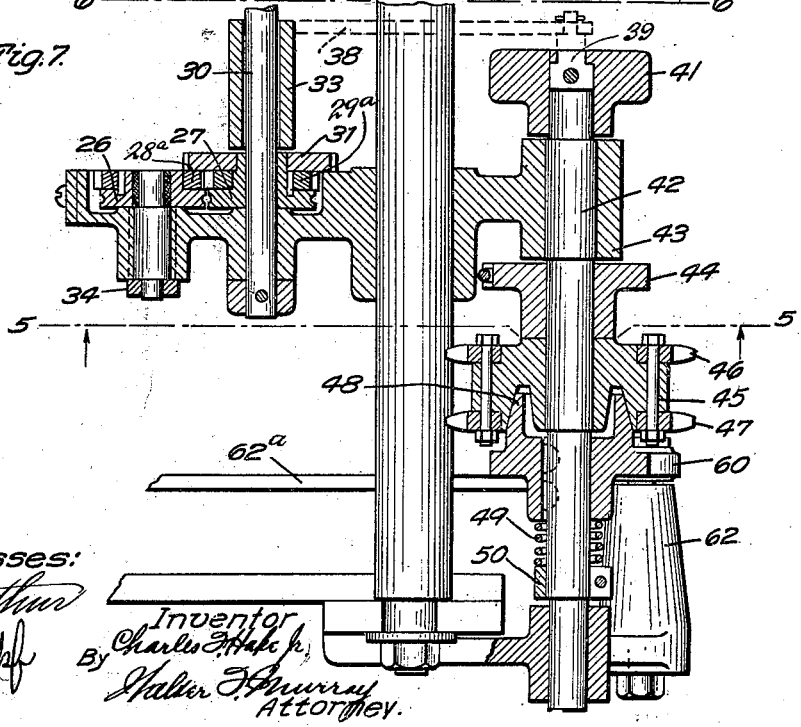

UNITED STATES PATENT OFFICE.

CHARLES F. HAKE, JR., OF CINCINNATI, OHIO.

MACHINE FOR SOLDERING THE JOINTS OF SHEET-METAL CANS.

1,377,339. Specification of Letters Patent. Patented May 10, 1921.

Application filed December 15, 1916. Serial No. 137,076.

*To all whom it may concern:*

Be it known that I, CHARLES F. HAKE, Jr., a citizen of the United States of America, and resident of Cincinnati, in the county of Hamilton and State of Ohio, have invented a new and useful Machine for Soldering the Joints of Sheet-Metal Cans, of which the following is a specification.

This invention relates to a machine for soldering the joints or seams of the bodies of sheet metal cans and particularly the seams of the bodies of cans constructed of a number of pieces of sheet metal.

An object of my invention is a mechanism for feeding the solder to and applying the solder on the can joint.

A further object of my invention is a machine in which the can automatically controls the actuating of the solder feeding mechanism.

An object of my invention is to produce a machine adapted to solder the joints of the bodies of sheet metal cans in such a manner that the solder will permeate the joints and become sweated therein.

A further object is to produce a machine adapted to solder the joints of can bodies more rapidly and more thoroughly than has been done heretofore.

A further object is to produce a machine for soldering the joints of the bodies of sheet metal cans with a minimum amount of solder, whereby the cost of production of can bodies having soldered joints, is materially reduced.

These and other objects are attained in the machine described in the following specification and illustrated in the accompanying drawings, in which:

Fig. 2 is a side elevation of a machine embodying my invention.

Fig. 3 is an end elevation of the machine embodying my invention, the view being taken from the feeding end thereof.

Fig. 4 is a longitudinal sectional elevation of my machine taken on the line 4—4 of Fig. 1.

Fig. 5 is a side elevation of the solder feeding mechanism of my improved machine, taken on the line 5—5 of Fig. 7.

Fig. 6 is a sectional view taken on the line 6—6 of Fig. 7.

Fig. 7 is a sectional plan view taken on the line 7—7 of Fig. 5.

Fig. 8 is a transverse sectional view taken on the line 8—8 of Fig. 4.

Fig. 9 is a transverse sectional view taken on the line 9—9 of Fig. 4.

Figure 1:
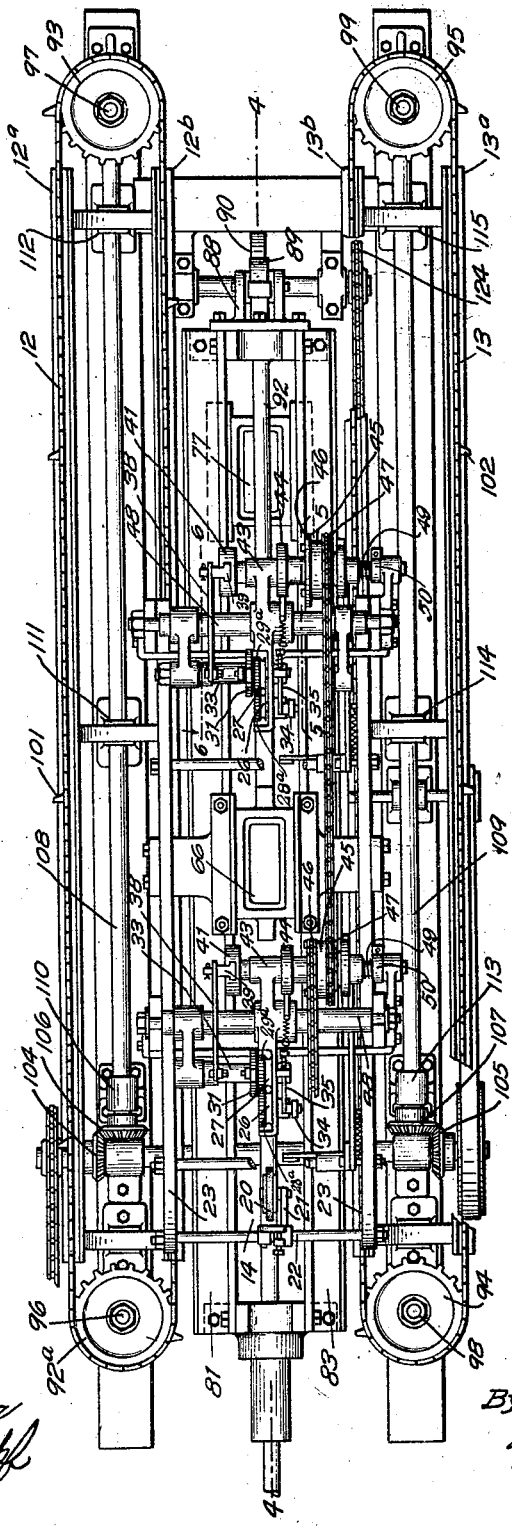
Figure 1 is a plan view of a machine embodying my invention.

The machine embodying my invention consists of a series of coöperating mechanisms adapted to perform separate and distinct functions. One of these mechanisms consists of the acid spreading device, another consists of the solder feeding device, another consists of the soldering device and another consists of the mechanism or conveyer for passing the can bodies successively into position to be operated upon by these devices. Each of the devices above mentioned is duplicated with the single exception of the conveyer, the duplication of each of these devices being for the purpose of soldering the several seams of joints to be found in large can bodies.

The machine upon which the several devices above named are mounted, consists of a frame work 10 carrying a form 11 over which the bodies of the cans are passed in their passage through the machine. Located on each side of the form are the conveyers 12 and 13, these conveyers being adapted to engage the can bodies in order to carry them along the form. As the can body passes from the can-shaping form not shown, the first mechanism with which it comes into engagement is the acid spreading mechanism 14 adapted to spread acid upon the joint located uppermost when the can body is placed upon the form 11. As the body continues in its movement over the form the next mechanism with which it engages is the solder feeding mechanism 15, this mechanism being adapted to feed ordinary wire solder in sufficient amount to solder the can joints as the bodies are passed beneath it. The amount of solder fed to the can bodies is rendered adjustable by the soldering mechanism and solder is fed to the can bodies only when the can contacts the trigger controlling the operation of the solder feeding mechanism. Further movement of the can body along the form 11 brings it into engagement with the soldering mechanism 16 which is adapted to utilize the solder fed by the mechanism 15 and which fuses the solder into the joints of the can bodies as they pass beneath it. Owing to the duplication of these mechanisms, further passage of the can body over the form 11, brings its lower joint into engagement with another acid spreading device 17 which operates in substantially the same manner as device 14.

Continued movement of the can body brings its lower joint into engagement with another solder feeding mechanism 18, the operation of which is controlled by the passage of the can body beneath it, in the same manner as device 15 is controlled. Having passed device 18 the lower joint of the can body is brought into operative relation with an additional soldering device 19, this device being identical with the construction of device 16.

After having passed device 19 the soldering operations of the can body are completed and it is passed from the form 11 into position for the finishing operations.

In the machine herein described the construction is particularly adapted to handle can bodies of two piece construction and in placing the bodies in position on the form 11, one of the joints thereof is located in such a position as to be on top with the other joint on the bottom. The top one is first brought into engagement with the acid spreading device 14, as disclosed in Fig. 4, which consists of a roller 20 having a felt covered surface, the roller being mounted on the swinging arm 21 mounted upon a shaft 22 extending between arms 23 of the frame 10 of the machine, in addition to a supply reservoir 24 located and secured above the machine in any suitable manner and position, the reservoir having an outlet 25 adapted to direct the acid onto the roller 20. Thus it will be seen that passage of the joint beneath the roller will cause a certain amount of acid to be distributed over the joint.

The next operation of the can body in its passage through the machine, is to be brought into coöperative relation with the solder feeding device 15. The major portion of this device is located above the can body and consists of feeding rollers 26 and 27 between which the wire solder 28 passes, this solder being supplied by a spool 29 located in a convenient position, see Fig. 4. The feed rollers 26 and 27 are rotated by means of gears 28$^a$ and 29$^a$, gear 29$^a$ being mounted upon a shaft 30 which is provided with a ratchet 31 for operation with a pawl 32 mounted upon a swinging arm 33 which is pivotally mounted on the extending end of the shaft 30. Reciprocation of arm 33 therefore causes rotation of the feed rollers and consequently feeds the solder between them. In order to maintain roller 26 in engagement with the solder 28 with sufficient tension to feed it between rollers 26 and 27, a tension device consisting of an arm 34 and bolt 35 and a spring 36 which is regulated by a nut 37 on the bolt 35, has been provided. In order to reciprocate arm 33 a link or connecting rod 38 which extends from arm 33 to a block 39 reciprocally mounted in the slot 40 formed in a rotating disk 41, has been provided. Block 39 is adjustably mounted in the slot by means of adjustment screw 40$^a$ which passes therethrough, so that the angular movement of arm 33 may be varied in order to feed the required amount of solder between feeding rollers 26 and 27. This disk is secured to a shaft 42 which is rotatively mounted in a bearing 43 of the frame and extends beyond the opposite side of the bearing so as to have mounted thereon a cam 44. Adjacent to this cam is a clutch member 45 carrying sprockets 46 and 47 through either one of which driving power is disseminated. Coöperating with clutch member 45 is its complemental member 48, this member being secured to shaft 42 and normally spring pressed into engagement with member 45 by means of a spring 49 bearing against it at one end and at its opposite end against the collar 50 secured to the shaft 42. Cam 44 is provided with an elevated portion 51 which during rotation of the cam is adapted to be brought into engagement with a roller 52 mounted on a swinging arm 53 carried by the frame. This arm 53 is a bell crank in shape, the lower arm 54 of which, is secured to a link 55 controlling the movements of a solder shearing knife 56 reciprocally mounted in a slide 57 located adjacent to the strip of wire solder. Coöperating with this knife is another knife 58, between which and knife 56 the solder is fed. Clutch member 48 is provided with a tooth 59 which is engaged by a pawl 60 extending from a lever 61 pivotally mounted on a shaft 62 extending from side to side of the frame carrying the solder-feeding mechanism. The lower end of this lever 61 is connected with a link 26$^a$ which is in turn connected with the upper end of a trigger 63, the lower end of which is located in the path of the can bodies passing through the machine. The trigger 63 is connected with a spring 64 adapted normally to retain the pawl 60 in engagement with clutch member tooth 59, so that operation of the solder feeding mechanism is prevented except when trigger 63 is engaged by a can body passing through the machine. Immediately upon engagement of the trigger by a can body, the solder feeding mechanism is released by disengagement of pawl 60 from tooth 59 and a strip of solder is fed between feed rollers 26 and 27 and between knife blades 56 and 58, knife blade 56 shearing off a strip of the desired length, as soon as hump 51 engages roller 52 of arm 53.

The next device encountered by the can body in its passage through the machine is the soldering device. This device consists of soldering irons 65 and 66 located in alinement with one another and in position to engage the uppermost joint of the can body as it passes over form 11. Mounted in the front soldering iron 65 is a tube 67 through which the strip of solder which has been sheared off after operation of the solder feeding mechanism, falls. These irons 65 and 66 are maintained at a high temperature by gas flames issuing from gas supply nozzles located in a gas supply pipe 68 located above the irons, the irons being formed hollow so as to retain the heat transmitted to them by the gas flames. The temperature of these irons is maintained sufficiently high to melt the solder dropped into the tube 67 from the solder feeding mechanism. After having passed the soldering irons the uppermost joint of the can body is finished.

At this time the can body is brought into engagement with the second acid spreading device 17. This device is especially designed to operate upon the lowermost joint of the body and consists of a roller 69 having a felt surface, this roller being adapted to engage the surface of an acid feeding roller 70 located in an acid pan 71 mounted on the frame of the machine. During its passage through this device, the can body engages roller 69 and lifts it away from roller 70 so that the joint passes between rollers 69 and 70. Roller 69 is mounted on a swinging arm 72 provided for this purpose. Continued motion of the can body brings its front edge into engagement with a trigger 73 adapted to operate the solder feeding device 18. This device is in all respects like the construction of device 15 and for this reason the above description of device 15 also applies to device 18. Having caused operation of device 18, the solder fed thereby, drops through a tube 74 and into a tube 75 extending from soldering iron 76 forming a portion of soldering device 19 which the can body next engages in its passage through the machine. The construction of device 19 is identical with that of device 16 and for this reason the above description of device 16 applies equally to device 19. However, the soldering irons 76 and 77 as well as tube 75 and burners 78 and 79 of soldering device 19, are located upon the interior of the form 11 and consequently upon the interior of the can during its passage through the machine. In addition to this, because of its interior location, soldering device 19 operates upon the interior of the lower joint of the can bodies instead of upon the exterior of the joint as does soldering device 16 in its operation upon the upper joint of the can body.

The form 11 upon which the can travels in its passage through the machine, consists of a series of angle irons 80, 81, 82 and 83 which are bolted to spiders 84, 85 and 86. Spider 84 is provided with a hollow spindle 87 adapted to be connected with a machine for forming the body of the can. This connection permits of the sheets from which the can bodies are constructed, being folded to embrace the form, so that support at this end of the form is secured from the coöperating body forming machine. At the opposite or delivery end of the form, a bracket 88 carrying a roller 89 is provided, the roller 89 being supported by a roller 90 rotatively mounted on a bracket 91 extending from the frame 10 of the machine. It will be seen that the interior soldering irons 76 and 77 are supplied with gas from a pipe 92 extending through the interior of the form and conducted from the point at which the form is connected with the body forming machine. This permits of the entrance of gas to heat the interior soldering irons, before the can bodies are closed.

Located on each side of the form are the conveyer mechanisms consisting of the chains 12 and 13 and the sprockets 92ª 93, 94 and 95 over which these chains pass. These sprockets are mounted on vertical shafts 96, 97, 98 and 99 mounted in brackets 100, such as disclosed in Fig. 4, located at opposite ends and on opposite sides of the frame 10. The chains 12 and 13 are provided with lugs 101 and 102 which are spaced at intervals on them. The lugs are so positioned that their straight faces engage the opposite edges of one end of the can body to carry it along over the form and into operative position with each of the acid spreading, solder feeding and soldering mechanisms. In order to support the chains between the sprockets, angle irons 12ª and 12ᵇ are provided for chain 12 and angle irons 13ª and 13ᵇ are provided for chain 13.

The driving mechanism for operating the various elements consists of a driving shaft 103 located at the receiving end of the machine and extending transversely of the frame 10. This shaft is provided with beveled gears 104 and 105 which mesh with beveled gears 106 and 107 secured to shafts 108 and 109 extending longitudinally of the machine and adjacent to the bed thereof. Shaft 108 is journaled in bearings 110, 111 and 112 and shaft 109 is journaled in bearings 113, 114 and 115. At their opposite ends the shafts are provided with bevel gears 116 which mesh with bevel gears 117 secured to the vertical shafts 97 and 99. Thus when shaft 103 upon which driving pulley 118 is mounted, is rotated, the conveyer chains will be operated by the above described mechanism. On the side opposite to that to which the driving pulley 118 is connected, a pulley 119 is mounted on shaft 103; this pulley having a belt 120 passing over a small pulley 121 which rotates acid spreading roller 70. Also located adjacent to pulley 119, but between the sides of the frame, is a sprocket 122 carrying a chain 123 and which passes over a sprocket 124 secured to shaft 125 to which roller 90 is secured. By this means the tendency for the bottom of the can to lag in its passage from the form, is overcome. On the opposite end of shaft 103 and adjacent to driving pulley 118 is mounted a pulley 126 over which passes a chain 127 extending to a sprocket 128 secured to a shaft 129 located above the body of the machine. This shaft also carries a sprocket 130 over which passes a chain 131 which in turn passes over the sprocket 46 mounted on the shaft 42 of the first solder feeding mechanism. Thus driving power is communicated to the first solder feeding mechanism. In order to operatively connect the first with the second solder feeding mechanism, a chain 132 is provided and passes over sprockets 47 of the first and second solder feeding mechanisms. Thus driving power is communicated from the first to the second solder feeding mechanism. The pulleys or sprockets are so proportioned that their connecting elements will drive the mechanisms to which they are attached in proper relation to one another and at speeds varying in proper proportion.

In operating the machine any suitable source of power may be provided. With the driving mechanism in operation, the conveyer chains are rotated and the various elements, connecting chains and sprockets are brought into operation. As the can bodies are placed on the form 11, they are engaged on opposite sides of their rear end edges by the lugs 101, and 102 with one can located between adjacent lugs so that each set of lugs 101 and 102 will handle one can. In being placed on form 11, the can is located in such a position that the two joints formed therein are located in a vertical plane with relation to one another. In their passage through the machine the top joint of the body first engages the acid spreading roller 12 and as the can body is forced along the form 11, its forward edge is brought into engagement with the trigger 63. This causes pawl 60 to be withdrawn from cam 59 and permits friction clutch 48 to operate to drive shaft 42 and consequently to operate the solder feeding mechanism. This is operated by reciprocation of arm 33 through its connection with link 38, to cause rotation of ratchet 31 and consequent rotation of feed rollers 26 and 27 between which the wire solder passes. After the feeding mechanism has been brought to the limit of its motion, bell crank 53 is engaged by hump 51 to reciprocate knife 56 and to cause the projecting piece of solder which has been fed by rollers 26 and 27, to be cut off. This solder drops through tube 67 and into the heated front portion of soldering iron 65, just as the front edge of the top joint of the can body reaches this joint. Continued passage of the can causes the solder which has been melted by iron 65, to be spread over the joint and to be sweated into it in the presence of the acid distributed to the joint by acid roller 15. As soon as the front edge of the can leaves the last of the top joint soldering irons the forward edge of the lower joint is brought between rollers 69 and 70, roller 69 spreading acid over the bottom joint in the same manner that roller 14 previously spread acid over the top joint. Substantially simultaneous with the engagement of the lower joint with roller 69, the forward edge at the top of the can body is brought into engagement with trigger 73. This causes operation of the second solder feeding device 18 in the same manner as the first solder feeding device was operated. However, the solder delivered by this device passes through tube 74, into tube 75 and into the front portion of soldering iron 76, where the solder is melted. By this time the forward edge of the bottom joint of the can body engages soldering iron 76 and the melted solder in the presence of the acid distributed by roller 69, is spread over the lower joint and is sweated into it in the same manner that the solder was spread and sweated into the upper joint of the can body. After leaving soldering irons 76 and 77 the can body is engaged by rollers 89 and 90 and is removed from the machine. After the can bodies pass the triggers 63 and 73, the springs 64 act to return their connected movable parts to normal positions and thereby stop the operation of the solder feeding mechanisms. At this point the can is taken up by the usual flanging, curling and bottom attaching mechanisms and is completed.

Having thus described my invention, what I claim is:

1. A machine for soldering the joints of sheet metal cans having a plurality of longitudinal joints, comprising a way for the cans, means to feed the can longitudinally along the way, a plurality of soldering means each adapted to individually solder a seam as the can passes over the way, means adapted to feed solder to each of the soldering mechanisms, and means controlled by the can bodies as they pass through the machine adapted to control the operation of the solder feeding mechanisms.

2. A machine for soldering internally the joints of cylindrical articles, comprising a soldering iron adapted to occupy a position within the articles to be soldered, as they pass through the machine, an iron heater adapted to occupy a position within the article to be soldered and adapted to heat the iron continuously, and means for feeding predetermined amounts of solder to positions between the iron and the joint to be soldered, whereby the interior of the joints of the articles will be soldered.

3. A machine for soldering the joints of the bodies of sheet metal cans, comprising a soldering mechanism for soldering certain of the joints of the cans exteriorly, a soldering mechanism for soldering certain of the joints of the cans interiorly, a solder feeding mechanism for each of the soldering mechanisms, a form adapted to receive the can bodies and upon which the can bodies are adapted to be moved into position to be operated upon by said mechanisms in substantially the order named, and means controlled by the can bodies as they pass through the machine, adapted to control the operation of the solder feeding mechanism.

4. A machine for soldering the joints of the bodies of sheet metal cans, comprising acid spreading, solder feeding, and a series of soldering mechanisms, a form adapted to receive the can bodies and upon which the bodies are adapted to be moved into position to be operated upon by said mechanisms in substantially the order named, certain of said soldering mechanisms being positioned upon the form to be located within the can bodies as they pass along the form, whereby the interior of certain of the joints of the bodies may be soldered, means controlled by the can bodies as they pass through the machine, adapted to control the operation of the solder feeding mechanisms, and a conveyer adapted to move the can bodies along the form.

5. A machine for soldering the joints of the bodies of sheet metal cans having a series of joints, an acid spreading mechanism for each joint, a solder feeding mechanism for each joint, located adjacent to the acid spreading mechanisms, and a soldering mechanism for each joint, located adjacent to the solder feeding mechanisms, certain of said soldering mechanisms being positioned to be located within the can bodies as they pass through the machine, whereby the interior of certain of the joints will be soldered, the other of the soldering mechanisms being located exteriorly of the can bodies as they pass through the machine, whereby the exterior of the remaining joints of the can bodies will be soldered, said mechanisms for each joint being adapted to operate substantially in the order named on their respective joints.

6. A machine for soldering the joints of the bodies of sheet metal cans, comprising an acid spreading device for each joint, a solder feeding mechanism for each joint, located adjacent to the acid spreading mechanisms, a soldering mechanism for each joint located adjacent to the solder feeding mechanisms said mechanisms for each joint being adapted to operate substantially in the order named on their respective joints, and a conveyer adapted to bring can bodies into position to be operated upon by said mechanisms in substantially the order named, certain of the soldering mechanisms being positioned to be located interiorly of the can bodies as they pass through the machine, whereby certain of the joints will be soldered interiorly of the bodies, and the other of the soldering mechanisms being located exteriorly of the can bodies in their passage through the machine, whereby the remaining joints of the bodies will be soldered exteriorly.

In testimony whereof I have hereunto subscribed my name this 13th day of December, 1916.

CHARLES F. HAKE, JR.

Witnesses:
RALPH H. INOTT,
WALTER F. MURRAY.